United States Patent [19]
Wakamoto

[11] Patent Number: 5,526,415
[45] Date of Patent: Jun. 11, 1996

[54] INTEGRATED COMMUNICATION SYSTEM WITH INTELLIGENT NETWORK AND TELECOMMUNICATIONS MANAGEMENT NETWORK

[75] Inventor: Masaaki Wakamoto, Kawasaki, Japan

[73] Assignee: Fujitsu Limited, Japan

[21] Appl. No.: 331,676

[22] Filed: Oct. 31, 1994

[30] Foreign Application Priority Data

Mar. 18, 1994 [JP] Japan ................................. 6-048710

[51] Int. Cl.$^6$ .......................... H04M 7/00; H04M 3/42
[52] U.S. Cl. ...................... 379/230; 379/202; 379/207; 379/220
[58] Field of Search ........................ 379/94, 111, 112, 379/113, 201, 202, 203, 204, 205, 206, 207, 219, 220, 221, 229, 230

[56] References Cited

U.S. PATENT DOCUMENTS 4,979,118  12/1990  Kheradpir ........................ 379/221 X

OTHER PUBLICATIONS

IEEE Communications Magazine, Fujioka et al., "Universal Service Creation and Provision Environment for IN", Jan. 1991, pp. 44–51.

Primary Examiner—Jeffery Hofsass
Assistant Examiner—Harry S. Hong
Attorney, Agent, or Firm—Greer, Burns & Crain, Ltd.

[57] ABSTRACT

An integrated communication system constituted by combining an intelligent network and a telecommunications management network. This communication system comprises a plurality of service switching points arranged dispersedly to execute basic call processing, a service control point for executing centralized control of the service switching points, and an operation system for executing centralized management of the service switching points. Network resources including the basic call processing of the service switching points are handleable in common as managed objects. The service control point communicates with the service switching points via a predetermined managed object interface. And the operation system communicates with the service switching points via the same interface as the managed object interface.

13 Claims, 7 Drawing Sheets

FIG. 5

[Attribute]
Object ID
Terminal Type
Service Type
Origination No.
Termination No.
Service Quality
Call Generation Time
Communication Start Time
Communication End Time
Communication Duration
Reason for Disconnection

[Operation]
Analyze Information
Call Gap
Call Information Request
Cancel
Collect Information
Connect to Resource
Continue
Initiate Call Attempt
Release Call
Reset Timer
Select Route

[Notice]
Analyzed Information
Call Information Report
Collected Information
Initial DP
O Answer
O Called Party Busy
O Disconnect
O Midcall
O No Answer
Origination Attempt Authorized
Route Select Failure

INTEGRATED COMMUNICATION SYSTEM WITH INTELLIGENT NETWORK AND TELECOMMUNICATIONS MANAGEMENT NETWORK

BACKGROUND OF THE INVENTION

1. Field of the Invention

The present invention relates to an integrated communication system constituted by combining an intelligent network (IN) and a telecommunications management network (TMN).

2. Description of the Related Art

According to the network architecture based on the known principle of distributed processing, the whole system is constituted by repetition of the same function, so that an advantage is achieved in view of extension of the network. However, from the standpoint of successively introducing new services in compliance with the recent tendency toward enhanced diversity of needs, it is necessary to realize repeated arrangements of the same function in the entire network at the introduction of new services, whereby the existence of limits is unavoidable as pointed out heretofore. For this reason, there is contrived an idea to accomplish that, while an exchange station maintains the conventional simple distributed processing mode, complicated processing relative to new services and so forth is executed by a centralized control method, and thus an intelligent network is proposed.

FIG. 1 is a schematic diagram for explaining how service control is executed in an intelligent network. In the intelligent network, its service control functions are dispersed to a service control point (SCP) 21 for centralized control and a service switching point (SSP) 22 arranged dispersedly, and a service is executed with mutual operations thereof.

In the service control point 21, a service logic program (SLP) 23 having a description of a service execution procedure is executed by a service logic execution environment (SLEE) in accordance with an event trigger obtained from the service switching point 22, and a call control instruction is outputted to the service switching point 22.

In the service switching point 22, the received instruction is translated under the supervision of a call state management 25, and a basic call processing (BCP) 26 conforming to a basic call state model (BCSM: standardized model of a call state transition from start to end) is executed in response to the instruction obtained from the service control point 21. Thus, introduction of a new service can be realized merely by adding the required function to the service control point 21.

Meanwhile, maintaining the reliability of the network is an important problem. However, the conventional network management is extremely inefficient in most cases since such maintenance is customarily performed per apparatus of each vendor or per communication equipment, and a management operating console is required for each vendor or equipment.

For this reason, attempts at standardizing an interface to exchange management information for each vendor or equipment have been tried, and a study relative to a telecommunications management network (TMN) is currently in progress.

In the telecommunications management network, an operation system (OS) for concentratively executing maintenance management and a managed system (inclusive of switching system and transmitting apparatus) are modeled as "manager" and "agent" respectively, and each of the apparatus and functions in the managed system is expressed abstractly as a managed object (MO), thereby enabling integrated management of various information communication equipment under a multi-vendor environment.

Now an example of the above will be specifically described with reference to FIG. 2 which explains connection setting in a telecommunications management network.

A managed system (switching system in this example) 27 is expressed by a managed object. A managed element object 28 is a logical expression of the switching system 27 which is a managed system in this case, and includes both a connection termination point (CTP) MO 29 and a fabric MO 30.

The connection termination point MO 29 expresses a logical termination point of a connection, and the fabric MO 30 is a logical expression of a channel apparatus. The fabric MO 30 includes a cross connection (XC) MO 31 which expresses a joint in the connection.

In the switching system 27 to be managed, the fabric MO 30 produces the cross connection MO 31 in response to a connection request "connect" outputted from a manager 33 in an operation system 32, and connects the connection termination points MO 29 and 29 to each other via the cross connection MO 31.

In the manner mentioned above, the intelligent network and the telecommunications management network are presently in the individual studies independently of each other on the basis of the respective purposes for introduction. And it is a current situation that, in the intelligent network and the telecommunications management network, each connection processing or setting is realized by an individual method through mutually different interfaces.

Consequently, it has been necessary heretofore to develop software independently with respect to the two networks mentioned, hence raising a problem of double development of software.

Another problem existing in the prior art resides in that it is impossible to perform proper operation (maintenance management) optimal to each service provided by the intelligent network.

Furthermore, it has been impossible to accomplish provision of an integrated new service which combines the service provided by the intelligent network and that by the telecommunications management network.

SUMMARY OF THE INVENTION

It is therefore an object of the present invention to attain common use of respective interfaces relative to an intelligent network and a telecommunications management network to thereby enhance efficiency in development of software.

Another object of the invention resides in achieving proper operation (maintenance management) optimal for each service provided by the intelligent network.

A further object of the invention is to realize an integrated new service which combines service control and operation.

In accordance with an aspect of the present invention, there is provided an integrated communication system constituted by combining an intelligent network and a telecommunications management network. The system comprises a plurality of service switching points arranged dispersedly to execute basic call processing, in which network resources including the basic call processing of the service switching points are handleable in common as managed objects; a service control point for executing centralized control of the service switching points by communicating with the service switching points via a predetermined managed object interface; and an operation system for executing centralized management of the service switching points by communicating with the service switching points via the same interface as the managed object interface.

Here, managed objects (MO) are such that, with adoption of the object orientation principle, component elements (apparatus and data representing traffic quantity and so forth) of a network to be managed are not handled as practical individual hardware or software but are expressed in common as information while the differences of vendors or kinds of apparatus are concealed from both the operation system and the service control point in such a manner that merely the functional differences can be recognized.

As the managed object interface mentioned above, there may be adopted the standard interface specified in the CMIS (Common Management Information Service, ISO/IEC 9595) and the CMIP (Common management Information Protocol, ISO/IEC, 9596).

According to the present invention, the basic call processing of each service switching point can be handled in common as a managed object, and the service control point is capable of communicating with the service switching points via the same interface as the managed object interface used for the operation system and the service switching points.

Consequently, the service control point and the operation system are enabled to operate in common the basic call processing managed objects (managed objects relative to basic call processing) and other managed objects in response to instructions of the same format, thereby eliminating the necessity of duplicate development of software with regard to the basic call processing and other processing as well.

Since any basic call processing managed object can be operated from the operation system, it becomes possible to perform a proper operation (maintenance management) optimal for the service provided by the intelligent network.

Besides the above, there is further achievable an advantage of providing an integrated new service which is a combination of the service provided by the intelligent network and the one by the telecommunications management network.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 5 shows exemplary definitions of a basic call processing managed object in the embodiment of the invention;

DESCRIPTION OF THE PREFERRED EMBODIMENT (1) Constitution of communication system in embodiment FIG. 3 is a block diagram showing the constitution of an integrated communication system with an intelligent network and a telecommunications management network to which the present invention is applied.

Figure 1:
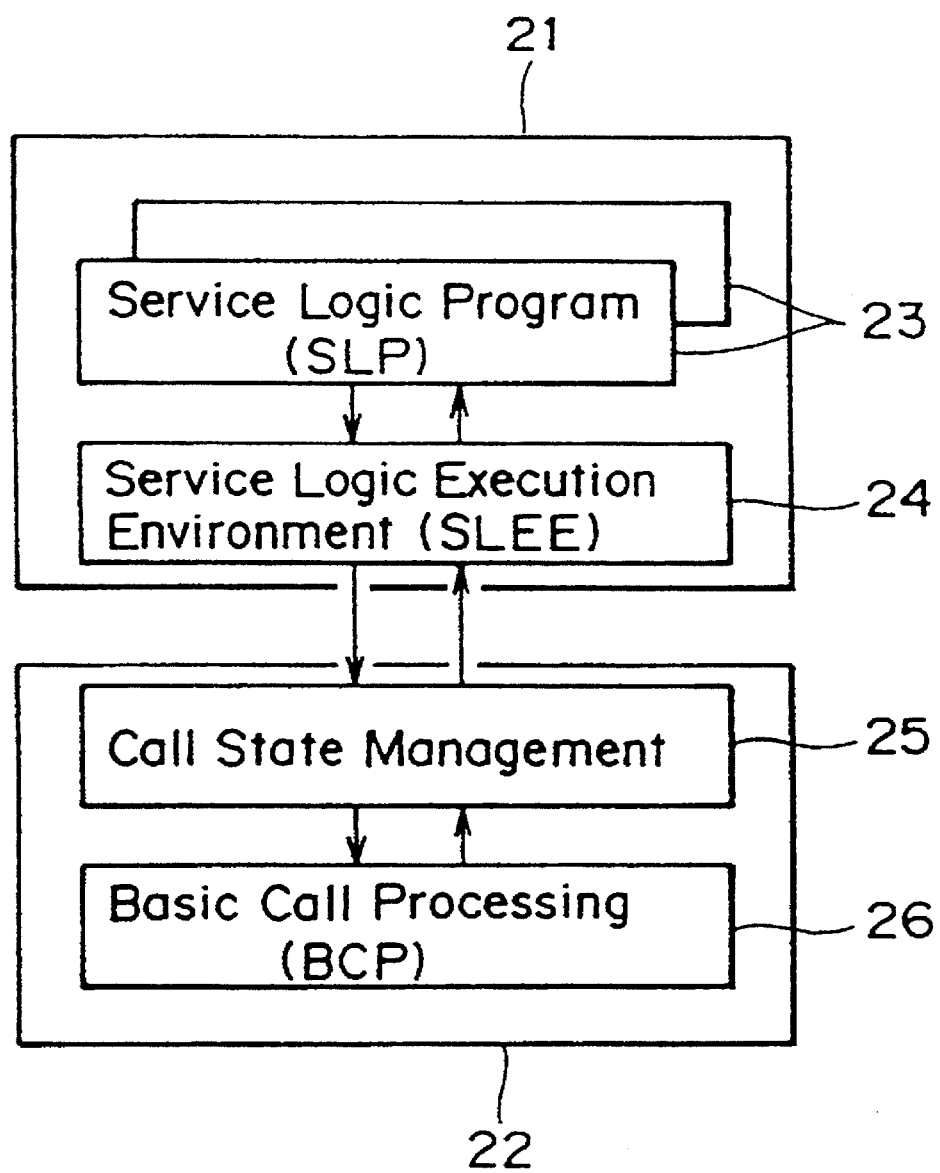
FIG. 1 is a schematic diagram for explaining how service control is executed in an intelligent network (IN)
Figure 2:
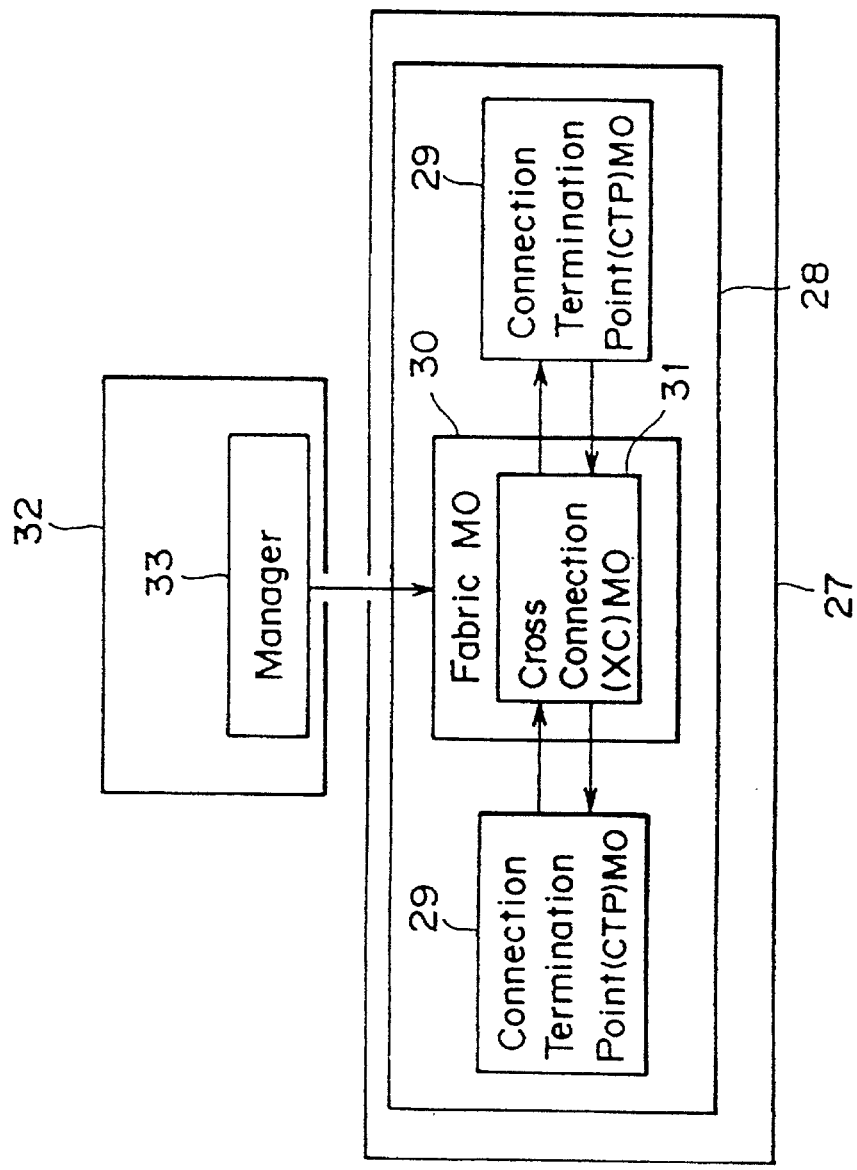
FIG. 2 is a schematic diagram for explaining how connection setting is executed in a telecommunications management network (TMN)

In this diagram, reference numeral 1 denotes a service switching point which incorporates a plurality of subscriber terminals therein. The service switching point 1 is connected to other service switching points via lines.

Denoted by 2 is a service control point connected to the service switching point 1. The service control point 2 is an apparatus which responds to a request (event/trigger) received from the service switching point 1 and provides a service corresponding to the request.

Reference numeral 3 denotes an operation system (OS) connected to the service switching point 1. The operation system 3 is a maintenance management apparatus for managing faults, troubles and so forth in the service switching point 1.

The service control point 2 has a plurality of service logic programs 4, a service logic execution environment 5 and a first manager processor 6. In the service logic program 4, a service execution procedure is described. The service logic execution environment 5 transmits an instruction, which is generated with execution of the service logic program 4, to the service switching point 1 and then executes the corresponding service logic program 4 in response to an event/trigger request received from the service switching point 1.

The first manager processor 6 provides a managed object interface for communication with the service switching point 1. As this managed object interface, there is adopted the standard interface specified in the CMIS (Common Management Information Service, ISO/IEC 9595) and the CMIP (Common Management Information Protocol, ISO/IEC 9596).

The operation system 3 has a plurality of management logic programs 7, a management logic execution environment 8 and a second manager processor 9. In the management logic program 7, an operation (maintenance management) execution procedure is described. The management logic execution environment 8 transmits an instruction, which is generated with execution of the management logic program 7, to the service switching point 1 and then executes the corresponding management logic program 7 in response to an event/trigger request received from the service switching point 1.

The second manager processor 9 provides a managed object interface for communication with the service switching point 1. As this managed object interface, there is adopted the same interface as the one provided by the first manager processor 6, i.e., the standard interface specified in the CMIS (Common Management Information Service, ISO/IEC 9595) and the CMIP (Common Management Information Protocol, ISO/IEC 9596).

The service switching point 1 has an agent processor 10, a call state manager 11, a basic call processing (BCP) managed object 12, a BCP log record managed object 13, and other managed object group 14. The agent processor 10 transmits and/or receives a message via the first manager processor 6 or the second manager processor 9. The call state manager 11 manages the call state changed sequentially in accordance with the situation of the service execution. The basic call processing managed object 12 executes its call processing in response to an instruction received from the service control point 2. The BCP log record managed object 13 performs batch management of the information relative to all basic calls being executed in the service switching point 1. The other managed object group 14 is used principally for the operation. The managed objects in this group 14 are such that, with adoption of the object orientation principle, component elements (apparatus and data representing traffic volume and so forth) of the service switching point 1, which is in the system to be managed, are not handled as practical individual hardware or software but are expressed in common as information while the differences of vendors or kinds of apparatus are concealed from the operation system 3 in such a manner that merely the functional differences can be recognized. The basic call processing managed object 12 and the BCP log record managed object 13 are so expressed as to represent the information relative to the basic call processing and the basic call, similarly to the other managed object group 14 mentioned above.

In the service control point 2, the instruction generated from the service execution environment 5 for execution of the service logic program 4 is transferred to the first manager processor 6. Then the first manager processor 6 sends the instruction to the service switching point 1 by conforming to the standard protocol (CMIS/CMIP) based on the managed object interface.

In the service switching point 1, the agent processor 10 extracts the received instruction in accordance with the standard protocol and changes the call state in the call state manager 11 in compliance with the content of the instruction, and then transfers the instruction to the basic call processing managed object 12. Subsequently in the basic call processing managed object 12, an "operation" corresponding to the instruction is started, and the predetermined call processing is executed. In this stage, the basic call processing managed object 12 notifies the BCP log record managed object 13 of the information (e.g., generation/release of basic call, type of service, bandwidth in use, etc.) obtained with regard to the call during execution of the call processing, and then such information is managed by the BCP log record managed object 13. Meanwhile in the operation system 3 also, the processing relative to the operation is executed by the same method as the above.

Due to employment of such a constitution, the service control point 2 and the operation system 3 are rendered capable of operating in common the basic call processing managed object 12, the BCP log record managed object 13 and the other managed object group 14 in response to instructions of the same format, hence eliminating the necessity of duplicate development of software with respect to the basic call processing and other processing as well. Furthermore, since the basic call processing managed object 12 can be operated from the operation system 3, it becomes possible to perform a proper operation (management) optimal for each service inclusive of basic call processing. In addition, the service control point 2 and the operation system 3 are capable of cooperating with each other, so that a new service is achievable with such mutual cooperation thereof.

(2) Exemplary constitution of basic call processing (BCP) managed object

Figure 4:
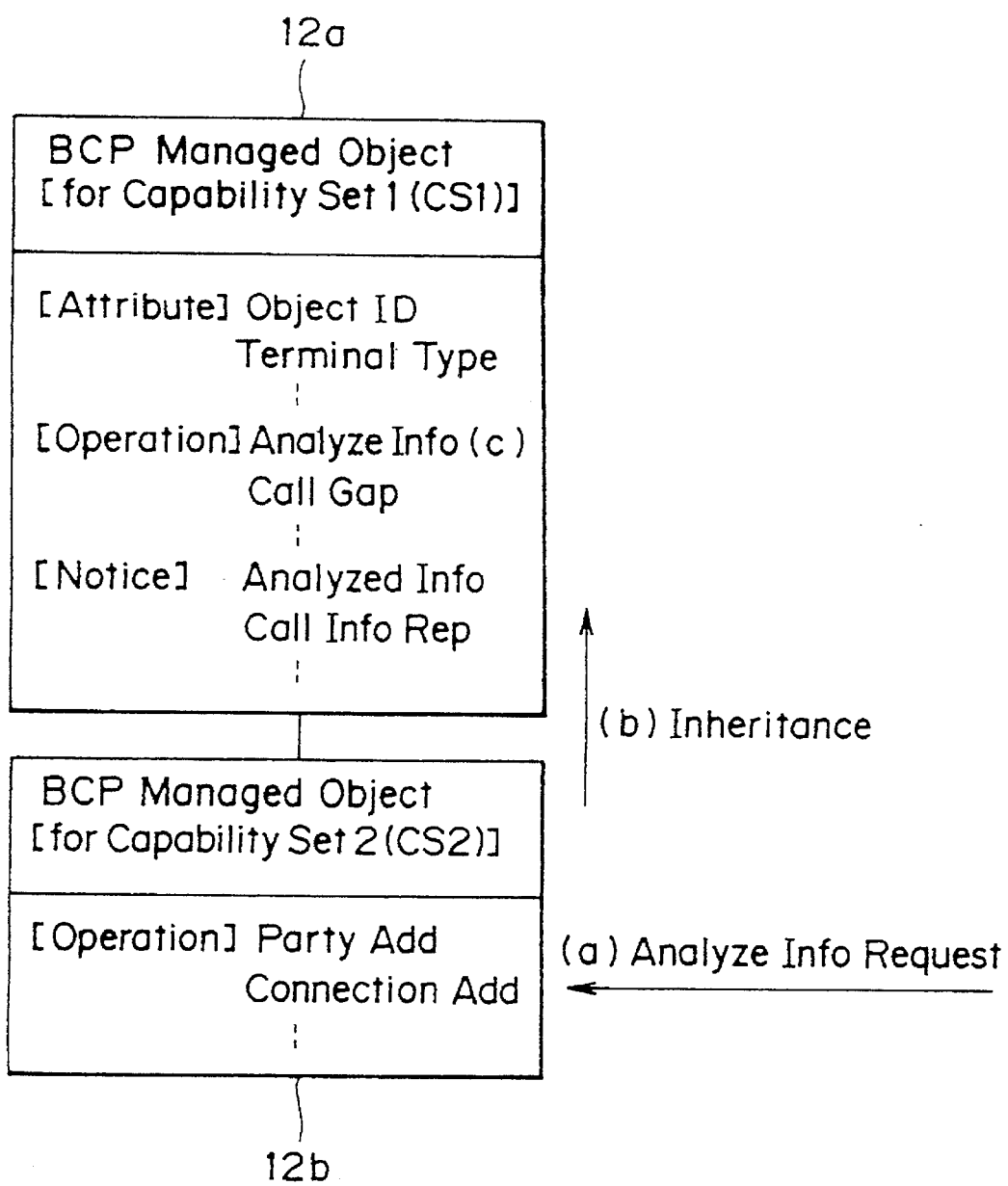
FIG. 4 shows an exemplary constitution of an inheritance hierarchy of a basic call processing managed object in the embodiment of the present invention.

An exemplary constitution of the BCP managed object 12 will now be described below. As shown in FIG. 4, the BCP managed object 12 is formed of an inheritance hierarchy structure. Regarding an upper BCP managed object 12a, the contents inclusive of [Attribute], [Operation] and [Notice] specified by the capability set 1 (CS1) in ITU-T (International Telecommunication Union-Telecommunication Standardization Sector) are defined as shown in FIG. 5.

Thereunder, a lower BCP managed object 12b for the capability set 2 (CS2: currently examined in ITU-T) is defined. In the BCP managed object 12b for the capability set 2, merely new additions to the BCP managed object 12a for the capability set 1 are defined. In the example of FIG. 4, "Party Add" and "Connection Add" in [Operation] are newly added, and these are defined in the BCP managed object 12b for the capability set 2.

The upper BCP managed object 12a for the capability set 1 and the lower BCP managed object 12b for the capability set 2 are mutually related by an inheritance pointer. When the intelligent network has advanced from the capability set 1 to the capability set 2, the service control point 2 transmits an instruction to the BCP managed object 12b for the capability set 2.

Assume now that the output instruction is the one defined already in the capability set 1 and used also in the capability set 2 (e.g., "Analyze Info" denoted by (a) in FIG. 4). Then, since this instruction is not defined in the BCP managed object 12b for the capability set 2, the upper BCP managed object 12a for the capability set 1 is specified with reference to the inheritance pointer as denoted by (b) in FIG. 4, and [Operation] denoted by (c) and defined in the specified upper BCP managed object 12a for the capability set 1 is executed.

Similarly, when a capability set 3 (CS3), a capability set 4 (CS4), a capability set 5 (CS5) and so on are prescribed, there is defined only the difference (new addition) with respect to the immediately upper BCP managed object (e.g., capability set 2 as seen from capability set 3), whereby an inheritance hierarchy is formed. Thus, it becomes possible to flexibly cope with addition of functions and so forth in the future by forming an inheritance hierarchy as mentioned.

(3) Basic call processing (BCP) log record managed object

Figure 6:
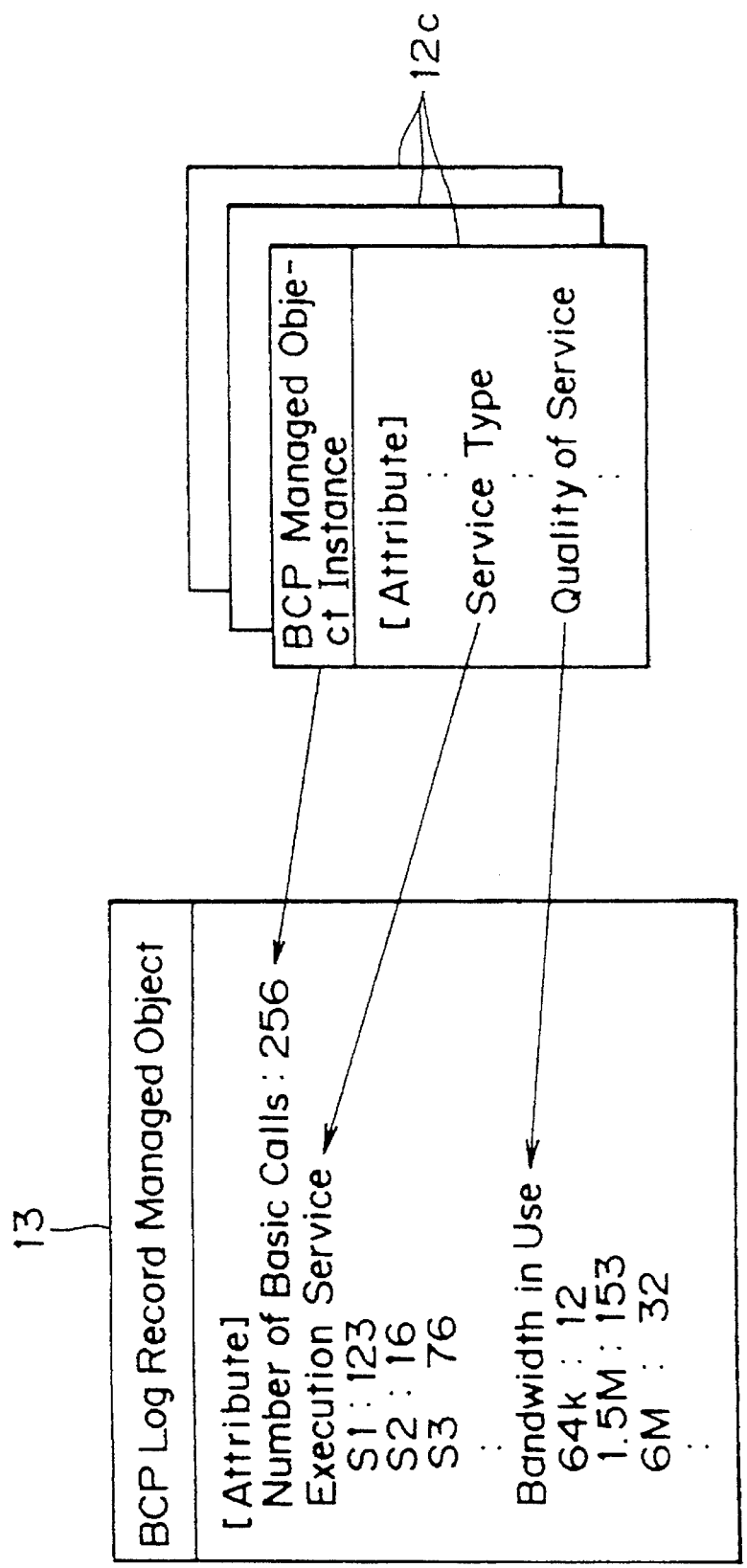
FIG. 6 is a diagram for explaining an example of a managed object relative to a basic call processing log record in the embodiment of the invention.

FIG. 6 shows an example of the BCP log record managed object 13. Denoted by 12c in this diagram is a BCP managed object (BCP managed object instance). This BCP managed object instance 12c is generated by the BCP managed object 12 at the time of generation of a call. In this managed object instance 12c, information (service type, quality of service, etc.) relative to each call is defined and set as [Attribute]. The managed object instance 12c is extinguished simultaneously with release of the call. Upon generation of each call, the BCP log record managed object 13 is notified of the information inclusive of such service type, quality of service and so forth defined as [Attribute] in the BCP managed object instance 12c.

As shown in FIG. 6, the BCP log record managed object 13 is such that the number of basic calls, execution services (S1, S2, S3, . . . ), bandwidth in use (64k, 1.5M, 6M, . . . ) and so forth are defined as [Attribute] therein. In response to the above notice, the BCP log record managed object 13 first recognizes generation of a new call and then counts up the value relative to "number of basic calls". Thereafter the BCP log record managed object 13 responds to the notice of "service type" and counts up the value relative to the corresponding service in "execution services". The managed object 13 further responds to the notice of "quality of service" and counts up the value relative to the corresponding bandwidth in "bandwidth in use". With regard to any other attribute, the managed object 13 counts up the relative value in accordance with the content of the notice in the same manner as the above. Since a release notice is received upon release of the call, the managed object 13 counts down the value relative to each attribute in response to this notice.

Whenever necessary, the operation system 3 is capable of reading the information per call (each attribute value in the BCP managed object 12c) and the information relative to the entire calls being executed (each attribute value in the BCP log record managed object 13) via the aforementioned managed object interface, whereby it is rendered possible to perform proper operations optimal for the individual services.

(4) Example of new service

Figure 3:
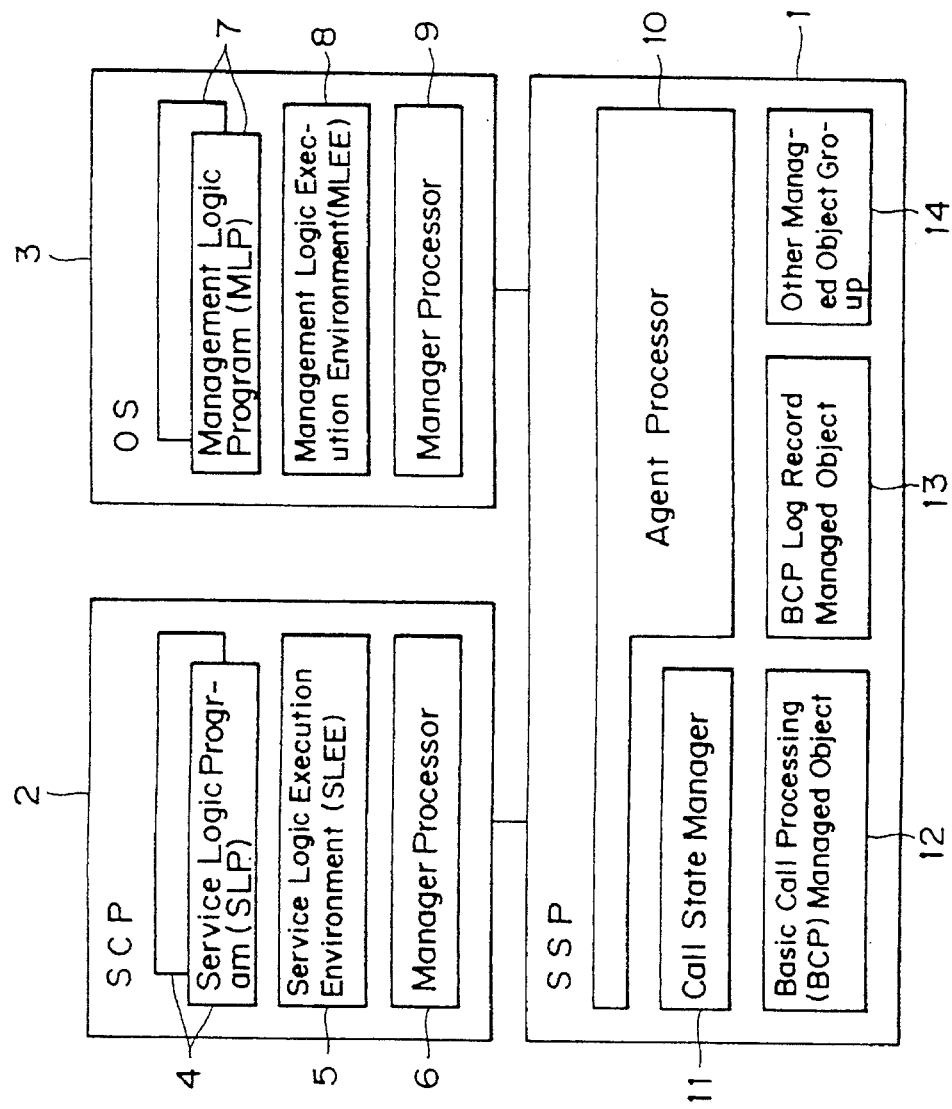
FIG. 3 is a block diagram of a preferred embodiment representing the communication system of the present invention.

An example of an integrated new service, which is a combination of service controls and operations realizable in the constitution of FIG. 3, will now be described below with reference to FIG. 7. According to this new service, an existing communication route (connection) already set is reset as another different communication route. This new service is adequately applicable to a variety of services, and it is particularly effective to an exemplary case where the service is shifted from a two-party talk to a three-party conference (three-party talk) and any of the service switching points concerned with the two-party talk is not equipped with a conference bridge which is a resource required for a three-party conference.

Figure 7:
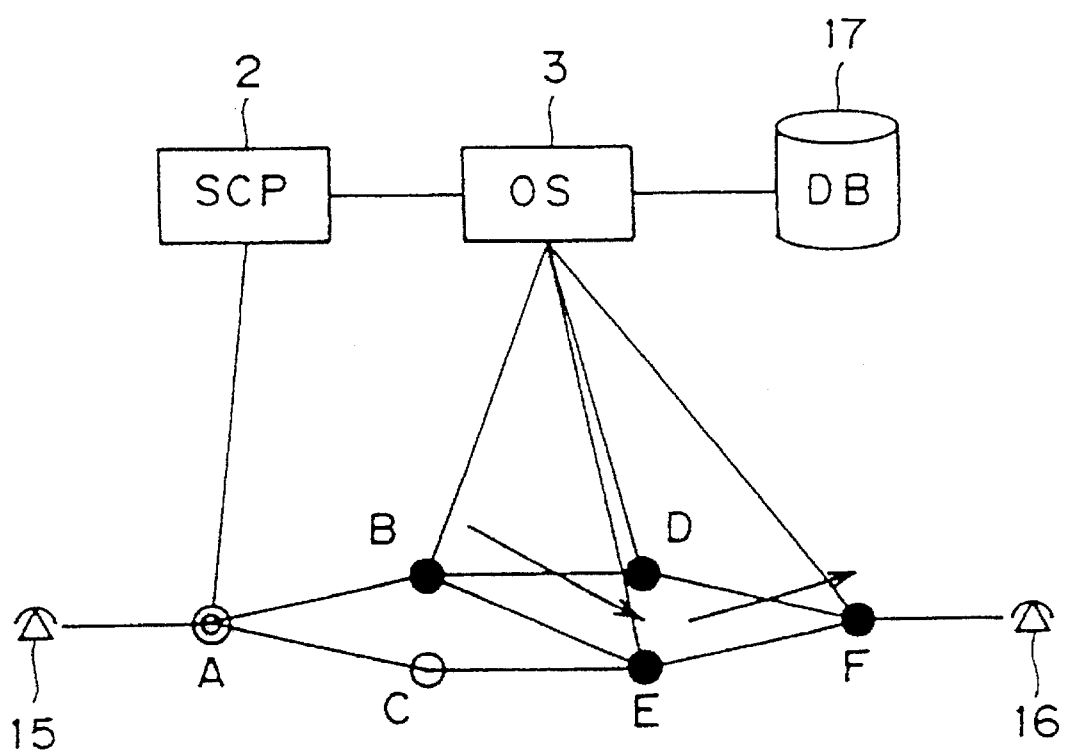
FIG. 7 is a diagram for explaining an example of a new service in the embodiment of the invention.

Denoted by A, B, C, D, E and F in FIG. 7 are the aforementioned service switching points 1, which are connected to the service control point (SCP) 2 and the operation system (OS) 3 via the managed object interface. In this example, the service control point 2 and the operation system 3 are connected to each other via an exclusive line. The operation system 3 is equipped with a data base (DB) 17 which stores network configuration information (relative to the service switching points constituting the network, and also to the lines connecting such service switching points).

Suppose now that an originating terminal 15 incorporated in the service switching point A and a terminating terminal 16 incorporated in the service switching point F are in a two-party talk via a communication route constituted of the service switching points A, B, D and F, and also that any of the service switching points A, B, D and F concerned with this two-party talk is not equipped with a conference bridge which is a resource required for a three-party conference service, while the service switching point E is equipped with a required conference bridge. In this state, if a request for a three-party conference service is transmitted from, e.g., the originating terminal 15, then an event "O Midcall" is sent from the service switching point A to the service control point 2. In this "O Midcall", "O" signifies an event from the originating terminal to the service control point 2 to request some processing in the talk state. And "O Midcall" in this case is an event for requesting that, during communication, the currently set communication route be reset as another different communication route. The BCP managed object 12 in the service switching point A having notified the service control point 2 of this event interrupts the call processing being executed.

Meanwhile the service control point 2 having received the event requests the operation system 3 to execute a process for changing the route. Then, in response to this request, the operation system 3 starts a management logic program 7 prepared for changing the route. More specifically, on the basis of the network configuration information stored in the data base 17, the operation system 3 selects, in accordance with a routing algorithm, a new connection (A-B-E-F in FIG. 7) including the service switching point E which is equipped with a conference bridge as a resource required for a three-party talk.

Subsequently, for the purpose of newly generating a call, the operation system 3 sends a message "Initiate Call Attempt" to the BCP managed objects 12 in the service switching points B, E and F which need to be switched over to the new connection. Then, each of the service switching points B, E and F having received this message generates call data required for call processing. Thereafter, for setting the new connection (A-B-E-F in FIG. 7), the operation system sends a message "Select Route", which uses a parameter based on the information relative to the new connection, to the BCP managed objects 12 in the service switching points B, E and F.

Then, in response to this message, the service switching points B, E and F set the new connection by driving the resource on the basis of the information relative to the new connection. For example, in the service control point B, a connection toward the service control point E is set. And after completion of setting the new connection, a message "Release Call" for releasing the call is sent to the BCP managed objects 12 in the service switching points B, D and F so as to release the unrequired connection (B-D-F) out of the former connections. Each of the service switching points B, D and F having received this message extinguishes the corresponding call data. And after completion of the above procedure executed in accordance with the route-change management logic program 7, the operation system 3 notifies the service control point 2 of completion of the route change procedure.

In response to the above notice, the service control point 2 sends a message "Continue" to the BCP managed object 12 in the service switching point A which transmitted the aforementioned event "O Midcall", so as to resume the call processing. Then the BCP managed object 12 in the service switching point A having received this message resumes the call processing from the interruption.

Thus, since the service control point 2 and the operation system 3 are capable of cooperating with each other, it becomes possible to provide a new service due to such mutual cooperation. It is to be understood here that the above new service represents merely an example, and some other new services are obviously providable as well.

(5) Effects

According to the present invention, as described hereinabove, an integrated communication system with an intelligent network and a telecommunications management network can be provided to consequently enhance the efficiency in development of software. And it is rendered possible to perform a proper operation optimal for each of the individual services being provided. Furthermore, there can be provided an integrated new service, which has not been realizable heretofore, by combining service control and operation.

What is claimed is:

1. An integrated communication system with an intelligent network and a telecommunications management network comprising:

a plurality of service switching points arranged dispersedly to execute basic call processing, wherein network resources including the basic call processing of said service switching points are handleable in common as managed objects;

a service control point for executing centralized control of said service switching points, said service control point capable of communicating with said service switching points via a predetermined managed object interface, said managed object interface having the ability to conceal hardware and software differences among said service switching points, while revealing functional differences among said service switching points; and an operation system for executing centralized management of said service switching points, said operation system capable of communicating with said service switching points via the same interface as said managed object interface.

2. The integrated communication system according to claim 1, wherein said managed object interface is the Common Management Information Service/Common Management Information Protocol CMIS/CMIP standard interface.

3. The integrated communication system according to claim 1, wherein a basic call processing managed object, which is a managed object relative to the basic call processing of said service switching point, is formed into an inheritance hierarchy structure, and when any item to be newly added is generated, such item is defined in a lower basic call processing managed object related to an upper basic call processing managed object.

4. The integrated communication system according to claim 1, wherein said operation system directly instructs a basic call processing managed object which is a managed object relative to the basic call processing of said service switching point.

5. The integrated communication system according to claim 1, wherein a basic call processing managed object, which is a managed object relative to the basic call processing of said service switching point, generates, at the time of generation of each call, a basic call processing managed object instance to be extinguished upon completion of said call, and information of the call inclusive of its service type and quality of service is defined as attribute in said basic call processing managed object instance.

6. The integrated communication system according to claim 5, wherein said basic call processing managed object includes a basic call processing log record managed object in which call-relevant maintenance running information adequate to be held in said basic call processing managed object inclusive of the number of basic calls, service type, bandwidth in use and communication time is defined as attributes, and the maintenance running information corresponding to said basic call processing log record managed object is renewed in compliance with generation and extinction of said basic call processing managed object instance.

7. The integrated communication system according to claim 6, wherein said operation system performs the operation with reference to the basic call processing log record managed object or the basic call processing managed object instance of said service switching point.

8. An integrated communication system with an intelligent network and a telecommunications management network comprising:

a plurality of service switching points arranged dispersedly to execute basic call processing, each of said service switching points having an agent processor and a call state manager for managing a call state changed sequentially in accordance with the situation of execution of the service, said agent processor enabling a network resource, which includes said basic call processing, to be handled in common as a managed object;

a service control point for executing centralized control of said service switching points, said service control point having a service logic program where a service execution procedure is described, a service logic execution environment for transmitting an instruction, which is generated with execution of said service logic program, to said service switching points and executing said service logic program in response to a request inclusive of an event from said service switching points, and a first manager processor for providing a managed object interface for communication with the agent processors of said service switching points, said managed object interface having the ability to conceal hardware and software differences among said agent processors, while revealing functional differences among said agent processors;

an operation system for executing centralized management of said service switching points, said operation system having a management logic program where an operation execution procedure is described, a management logic execution environment for transmitting an instruction, which is generated with execution of said management logic program to said service switching points and executing said management logic program in response to a request inclusive of an event from said service switching points, and a second manager processor for providing the same managed object interface as the one provided by said first manager processor for communication with said service switching points.

9. The integrated communication system according to claim 8, wherein said service control point and said operation system are mutually connected via an exclusive line in such a manner as to be capable of directly communicating with each other.

10. The integrated communication system according to claim 8, wherein said operation system has a data base which stores information relative to network resources of the service switching points.

11. The integrated communication system according to claim 8, wherein said operation system directly operates a basic call processing managed objects which are relative to the basic call processing of said service switching points, and the basic call processing managed objects of said service switching points execute generation and release of a call on the basis of an instruction from said operation system.

12. The integrated communication system according to claim 8, wherein said management logic program of said operation system includes a route-change management logic program, and whenever necessary during execution of a service, said service control point requests said operation system to start the route-change management logic program, and after completion of the route change by said operation system, said service control point proceeds with execution of said service.

13. An integrated communication system with an intelligent network and a telecommunications management network comprising:

a plurality of service switching points arranged dispersedly to execute basic call processing, each of said service switching points having an agent processor and a call state manager for managing a call state changed sequentially in accordance with the situation of execution of the service, said agent processor enabling a network resource, which includes said basic call processing to be handled in common as a managed object;

a service control point for executing centralized control of said service switching points, said service control point having a service logic program where a service execution procedure is described, a service logic execution environment for transmitting an instruction, which is generated with execution of said service logic program, to said service switching points and executing said service logic program in response to a request inclusive of an event from said service switching points, and a first manager processor for providing a managed object interface for communication with the agent processors of said service switching points, said managed object interface having the ability to conceal hardware and software differences among said agent processors, while revealing functional differneces among said agent processors;

an operation system for executing centralized management of said service switching points, said operation system having a management logic program where an operation execution procedure is described, a management logic execution environment for transmitting an instruction, which is generated with execution of said management logic program to said service switching points and executing said management logic program in response to a request inclusive of an event from said service switching points, and a second manager processor for providing the same managed object interface as the one provided by said first manager processor for communication with said service switching points, wherein said management logic program of said operation system includes a route-change management logic program, and whenever necessary during execution of a service, said service control point requests said operation system to start the route-change management logic program, and after completion of the route change by said operation system, said service control point proceeds with execution of said service, and when a request for switching from a two-party talk service to a three-party conference service is transmitted from said service switching point to said service control point and if none of the service switching points concerned with the two-party talk service is equipped with a resource required for the three-party conference service, said service control point requests said operation system to start the route-change management logic program, and then said operation system changes the present route to another route including said service switching point equipped with the resource required for the three-party conference service.

* * * * *

UNITED STATES PATENT AND TRADEMARK OFFICE
CERTIFICATE OF CORRECTION

PATENT NO. : 5,526,415
DATED : June 11, 1996
INVENTOR(S) : Wakamoto

It is certified that error appears in the above-indentified patent and that said Letters Patent is hereby corrected as shown below:

Column 1, line 32, delete "its" and insert --the--.

Column 2, line 2, after "system", delete "is" and insert --are--.

Column 3, line 20, after "(common" delete "management" and insert --Management--.

Column 3, line 41, after "above," delete "there" and insert --it--, and after "is" delete "further achievable an".

Column 3, line 41-42, before "an integrated" delete "advantage of providing" and insert --possible to provide--.

Column 7, line 18, after "is", delete "adequately".

Column 7, line 19, after "effective" delete "to".

UNITED STATES PATENT AND TRADEMARK OFFICE
CERTIFICATE OF CORRECTION

PATENT NO. : 5,526,415
DATED : June 11, 1996
INVENTOR(S) : Wakamoto

It is certified that error appears in the above-indentified patent and that said Letters Patent is hereby corrected as shown below:

Column 11, line 7, delete "differneces" and insert --differences--.

Signed and Sealed this

Twenty-sixth Day of August, 1997

*Attest:*

BRUCE LEHMAN

*Attesting Officer*  *Commissioner of Patents and Trademarks*